(12) United States Patent
Thomson et al.

(10) Patent No.: US 11,245,592 B1
(45) Date of Patent: Feb. 8, 2022

(54) TEMPLATE VALIDATION FOR VIRTUALIZED RESOURCES

(71) Applicant: Amazon Technologies, Inc., Reno, NV (US)

(72) Inventors: Laura Wingert Thomson, Seattle, WA (US); Venkat Srinath Vutphala, Bothell, WA (US); Laxman Kasyap Kolipaka, Bellevue, WA (US); Hamrit Sidhu, Seattle, WA (US); Anoop Kapoor, Seattle, WA (US); Ajit Gupta, Seattle, WA (US); Udit Sharma, Bellevue, WA (US); Wayne Davies, Cape Town (SA); Zac Jared Melnick, Cape Town (SA); Jean Anre Breytenbach, Cape Town (SA); Kevin Boardman, Cape Town (SA)

(73) Assignee: AMAZON TECHNOLOGIES, INC., Seattle, WA (US)

(*) Notice: Subject to any disclaimer, the term of this patent is extended or adjusted under 35 U.S.C. 154(b) by 78 days.

(21) Appl. No.: 16/789,778

(22) Filed: Feb. 13, 2020

(51) Int. Cl.
*H04L 12/24* (2006.01)
*H04L 29/08* (2006.01)
*G06F 9/455* (2018.01)

(52) U.S. Cl.
CPC ............ *H04L 41/14* (2013.01); *H04L 41/069* (2013.01); *H04L 67/10* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 10,909,109 B1* | 2/2021 | Kambhampati | .... G06F 16/2379 |
| 2009/0171705 A1* | 7/2009 | Bobak | .................. G06Q 50/188 705/80 |
| 2015/0379427 A1* | 12/2015 | Dirac | ..................... G06N 20/00 706/12 |
| 2019/0278928 A1* | 9/2019 | Rungta | ................... G06F 9/485 |

* cited by examiner

*Primary Examiner* — June Y Sison
(74) *Attorney, Agent, or Firm* — Hogan Lovells US LLP (57) ABSTRACT

Various embodiments provide for the creation and validation of resource templates that may be used to provision or launch resources or resource instances. In various embodiments, a user can use values for various resource instance parameters to create a resource template, and can request validation of that template. A validation service can perform multiple validations, including independent validation of all template parameters, as well as validations of cross-parameter dependencies. If any errors are detected that cause the template to be invalid, information for those errors can be returned to the user such that the user can make the appropriate changes to enable the template to be valid. Templates can be re-validated at future times, such as at launch time or for use with a new service, to ensure the template remains valid under those circumstances.

20 Claims, 7 Drawing Sheets

TEMPLATE VALIDATION FOR VIRTUALIZED RESOURCES

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. The resources can be physical resources or virtual resources provided through virtualization. In some instances, a user can utilize a template for new resources to be launched in such an environment, in order to enable multiple resources to be launched consistently and without a manual configuration each time. In the event of an incorrect or invalid template, however the user often must spend a significant amount of time on the complex task of debugging the template.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the aforementioned and other deficiencies experienced in conventional approaches to managing aspects of resource sharing and allocation in an electronic environment. In particular, various embodiments provide for the creation and validation of parameter templates that may be used to provision or launch resources or resource instances. In various embodiments, a user can use values for various resource instance parameters to create a launch template, and can request validation of that template. A validation service can perform multiple validations, including independent validation of these parameters, as well as validations of cross-parameter dependencies. If any errors are detected that cause the template to be invalid, the validation process can continue to the extent possible, so that the most information about those errors can be returned to the user such that the user can make the appropriate changes to enable the template to be valid. Templates can be re-validated at future times, such as at launch time or for use with a new service, to ensure the template remains valid under those circumstances.

Various other applications, processes, and uses are presented below with respect to the various embodiments.

Figure 1:
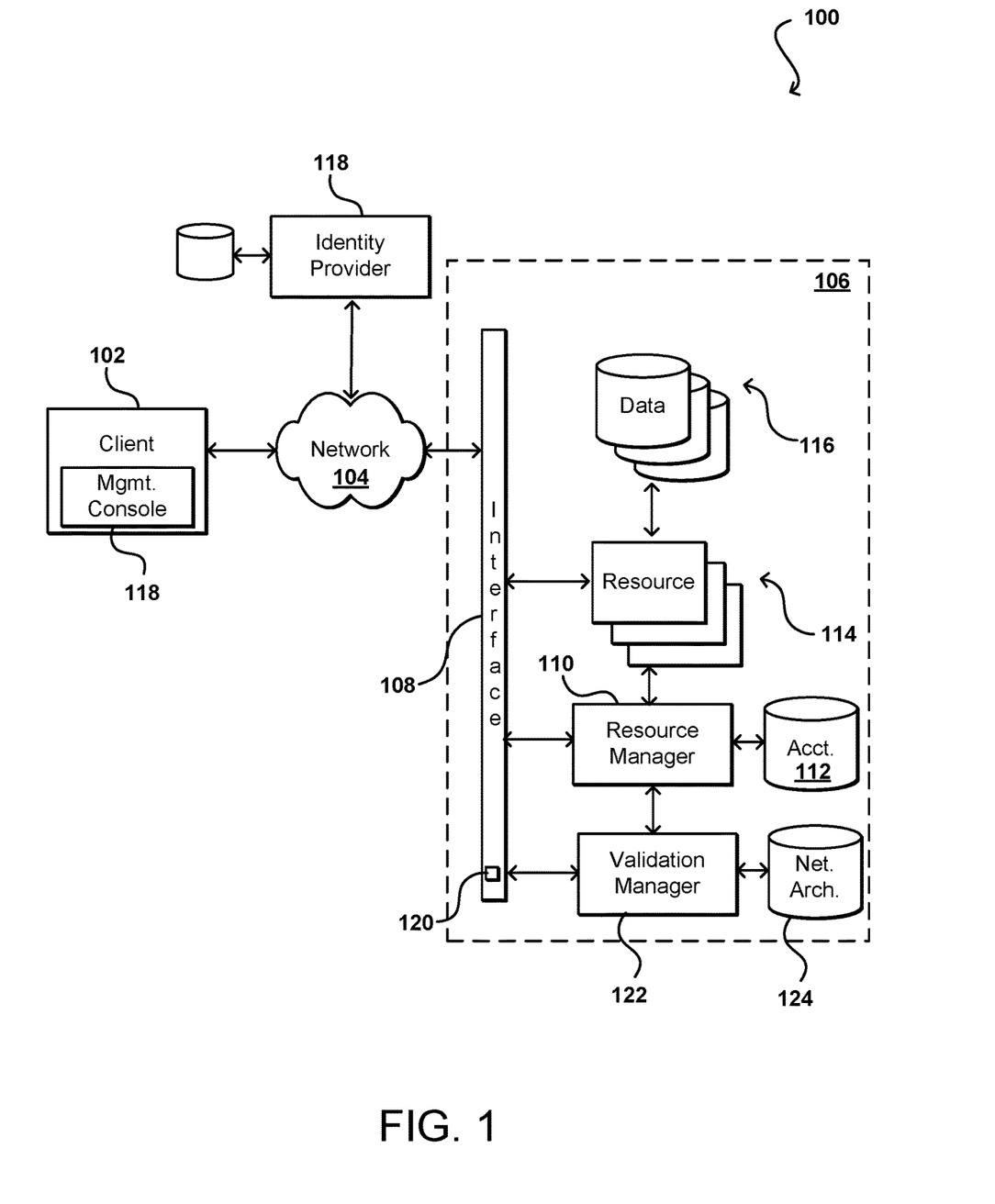
FIG. 1 illustrates an example system for providing resources using one or more templates that can be utilized in accordance with various embodiments.

FIG. 1 illustrates an example environment 100 in which aspects of various embodiments can be implemented. In this example a user is able to utilize a client device 102 to submit requests across at least one network 104 to a resource provider environment 106. The client device 102 can include any appropriate electronic device operable to send and receive requests, messages, or other such information over an appropriate network and convey information back to a user of the device. Examples of such client devices include personal computers, tablet computers, smart phones, notebook computers, and the like. The network(s) 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

The resource provider environment 106 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

In various embodiments, the resource provider environment 106 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instance of one or more types of these resources. In at least one embodiment, a resource instance can include storage volumes, compute instances, and network interfaces, among other such options. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager 110 can utilize dedicated APIs 120 in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service.

In many instances a customer of a resource provider environment 106 will want to specify various parameters of a resource instance to be provisioned in such an environment. A customer, or user associated with a customer, might utilize a management console 118 executing on, or accessible through, a client device 102 in order to specify various parameters for a resource instance (physical or virtual) to be launched or provisioned in the resource provider environment 106. In order to avoid having to specify the same parameters each time a new instance is to be launched, a customer might utilize one or more resource parameter templates to launch or provision these new instances. An example resource parameter template can include values for at least a subset of parameters to be specified when launching an instance, as may vary by provider or type of instance. Example parameters might include, for example, instance type, instance identifier, machine image, encryption, virtual name, snapshot identifier, and the like. A customer might generate and populate these parameter fields in order to enable instances to be launched or provisioned without the need to manually specify the values to be used for the new instance(s).

Using conventional approaches, however, customers may encounter various difficulties in provisioning instances using parameter templates. For example, a customer may not know which parameters need to be specified, or the possible set of values for each parameter field. Further, a customer may not know of various dependencies between parameters, such that while two parameter values might be independently valid, they are not valid together for a given instance. Using conventional approaches, a user would generate a template and attempt to launch an instance using that template. In the event of a problem with one or more parameter values in the template, the launch would fail and a generic error message would often be returned. The user would then need to attempt to determine the reason for the failure. Even if a reason for the failure were to be given, however, the user would need to determine how to rectify the problem, which may require very detailed knowledge of the architecture of the resource provider environment. In many instances, this involves communication with the resource provider to attempt to determine and rectify the problem(s). If there are multiple errors, this could be further complicated by a multi-step process where it may be unclear whether certain changes have a positive or negative impact on the success of the launch.

Accordingly, approaches in accordance with various embodiments provide for validation of templates used in the provisioning or launching of electronic resources, such as virtual resource instances. In at least one embodiment, a validation service can validate parameter values that are to be used to provision an instance, including validating syntax and existence. Such a validation service can also provide validation of dependencies between parameters where such dependencies exist. In at least one embodiment, a validation service can also determine a system or service for which an instance is to be launched, such as might utilize an autoscaling or batch creation service, and can validate against requirements for the corresponding service. A validation service can analyze the various launch parameters of a template, perform various types of validations, and determine whether the template is valid for launching such an instance. If valid, the service can provide a notification of validity and the customer can use that template to launch instances, although in at least some embodiments a re-validation can be performed to ensure that there have been no changes that would negatively impact the validity. If the template is determined to not be valid, the validation service can provide a list of reasons (if more than one) as to why the template could not be validated. In at least some embodiments, this error messaging can include details to help the customer understand specific things that caused the errors so they can be fixed, and in some instances can provide recommendations or auto-remediation. In at least some embodiments, a template management service can also be provided that enables a customer to generate, modify, download, or otherwise obtain or provide resource templates. In some embodiments, a template management service can work with a validation service to at least partially validate the template during the template creation or modification process, such that a customer cannot create a full launch template that is unable to be used to launch a valid instance.

In the environment 100 of FIG. 1, a user could utilize the management console 118 to create a resource parameter template. Such resource parameter templates that enable the creation of specifically configured instances within a cloud provider network are also referred to as launch templates, quickstart templates, image templates, instance templates, and virtual machine templates, in various embodiments. The user could then select an option to validate the template, whereby values for the template could be analyzed by a validation manager 122 in the resource environment with access to information about the architecture of the network as stored in an appropriate repository 124, as well as information for currently available resources as may be available through a resource manager 110 or other such source. The validation manager can perform the validation and then return notification of the validity or invalidity, with information about the errors in the case of invalidity that can be provided through the management console. In other embodiments, a user might create a resource parameter template on the client device 102 and then submit the template (or values for the template) through an API 120 to be analyzed by the validation manager. If a console is used, partial validation may be performed during the generation or modification of the template, while in the case of an API a validation may be able to be performed or requested only for a completed template. In at least some embodiments, downstream APIs can be used to obtain properties for use in validation, such as by comparing valid values to values contained in the template to be validated. In at least one embodiment, a validation manager 122 can help to ensure that a user creates well-formed, operationally valid templates by performing at least three types of parameter validation. A first validation involved determining, for any resource identifiers (IDs), that these resources exist within the relevant environment, such as the resource provider environment 106 or any sub-environments or regions there within. A second validation can occur for valid resources, where the validator can confirm that the customer has permission to access the relevant resources. Another validation can involve cross-parameter checking, or parameter dependencies, to confirm whether two (or more) parameters work together. This can include, for example, ensuring that a valid machine image is specified if required for a specified instance type. In at least one embodiment, these checks can be performed in response to a single API call, and the customer is returned either an indication that the template is valid or a list of the failures.

Figure 2A:
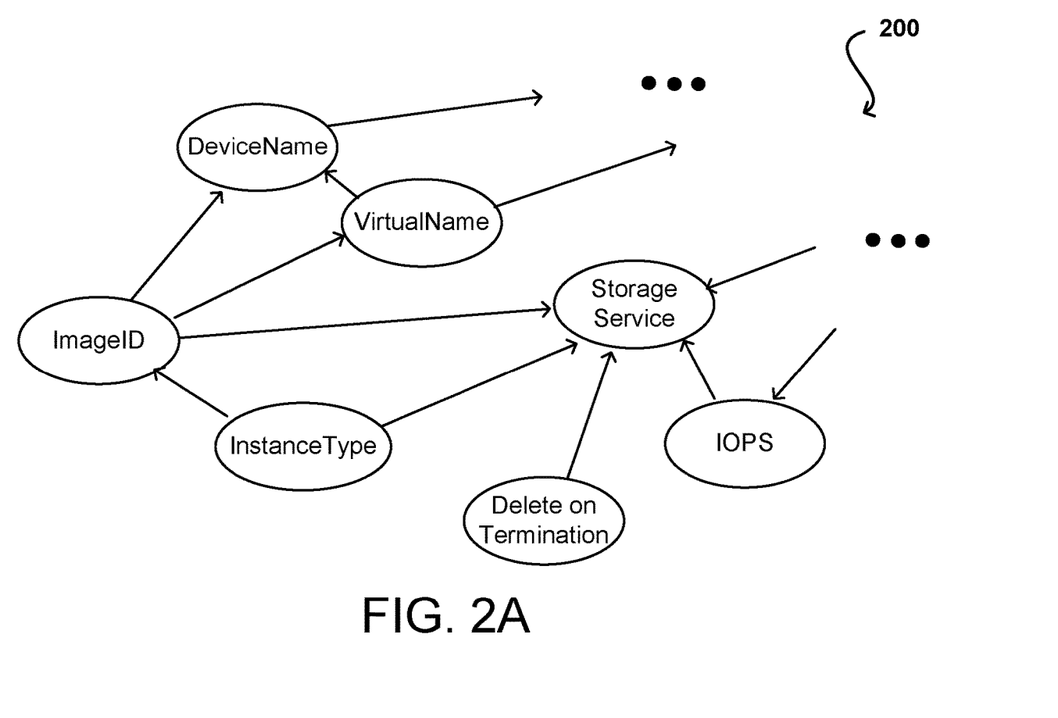
FIGS. 2A and 2B illustrate states of a template parameter graph that can be utilized in accordance with various embodiments.

In at least one embodiment, a template to be validated can first be analyzed to generate a parameter graph where parameters are represented as nodes connected by dependencies. It should be noted that a graph may be generated virtually using nodes and dependencies, without generating a viewable or graphical representation as illustrated. A portion 200 of an example parameter graph is illustrated in FIG. 2A, where parameters such as DeviceName and ImageID are connected because there is a dependency of DeviceName on ImageID. Such a parameter graph can be useful for validation because it first presents a full set of parameters to be validated independently, such as to ensure proper syntax, existence, and capacity of each relevant resource, element, identifier, etc. Such a graph further ensures that all dependencies are validated, and that dependencies are validated in the proper direction. Further still, such a graph can provide an ordering for validation in order to ensure validity of all parameters therein.

Figure 2B:
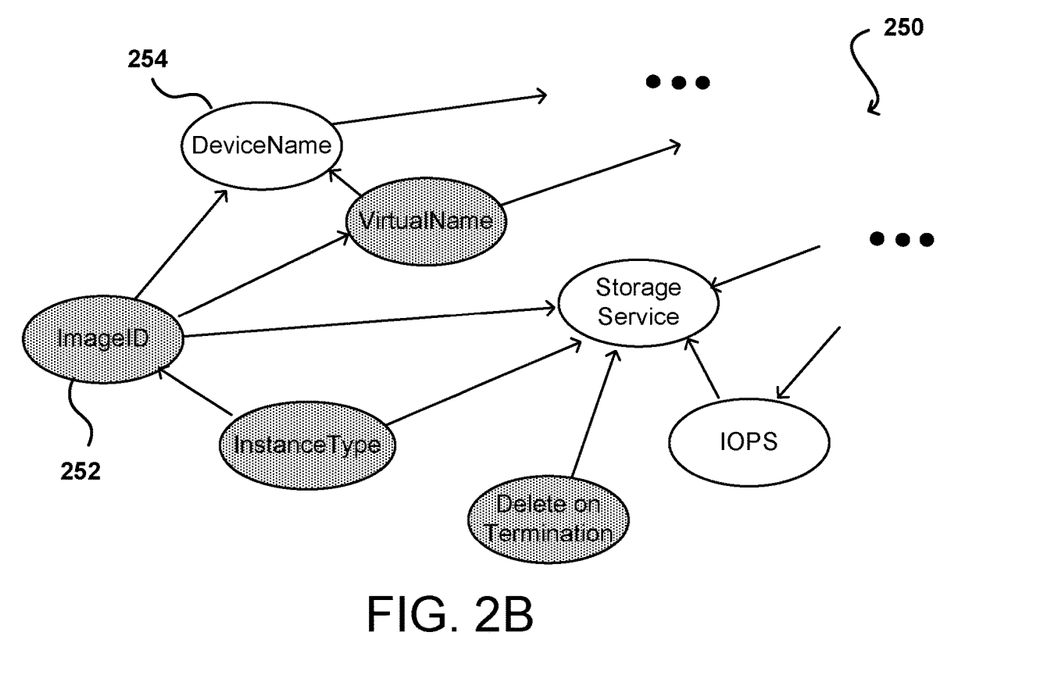

For example, in a first validation step the graph 200 can be traversed in order to ensure that each parameter contained therein is independently valid. In the case of template creation through a console, this may be able to be at least partially performed at creation time, in order to ensure that each individual parameter value is independently valid for the respective parameter type, and that the customer has access to utilize any resource or functionality associated with that parameter value. In at least some embodiments this validation can start at the leaf nodes, or nodes furthest away from a root node along any branch or path of the graph. In other embodiments all nodes can be independently processed in any relevant order, since dependencies are not being considered at this stage. Leaf nodes can be identified as not depending upon any other node in the graph. Once those nodes have been independently validated, the path between nodes can be traveled starting from these leaf nodes to validate dependencies between nodes, where a given node will only be valid if that node value is determined to be valid and also that any node dependencies are also valid. In the event of an error, that error can be cached or logged, and the validation can continue. The process can continue towards a root node, such as in the portion 250 illustrated in FIG. 2B, where leaf nodes have been validated and a subset of the dependencies, as illustrated by shaded nodes, and the process continues along the branches of the graph until all nodes have been processed to attempt to determine validity (or where another termination criterion has been satisfied). In FIG. 2B, node 252 has been validated both independently and due to a valid dependency, and this can then be used to validate node 254, which has a dependency on node 252. In at least some embodiments a best effort approach can be used to attempt to validate the template to the extent possible, even in the presence of errors, in order to provide a user with as complete a picture of validity as possible.

Once the validation process has completed, at least to the extent possible, information about any discovered errors can be returned with a notification of invalidity.

In one example, a customer might specify through the template to create an instance type in a specific region. An example workflow would be to first determine that the instance type is valid. Looking to the graph in FIG. 2A as an example, the workflow can then validate Image ID, which has a dependency on instance type. If both Image ID and Instance Type are independently valid, and their dependency can be validated, then Image ID can be validated and nodes such as Device Name and Virtual Name can be validated, which each have a dependency on Image ID. This process can continue until all nodes have had a validity determination in at least some embodiments. A list of detected errors can then be returned for an invalid template. In at least some embodiments, dependencies may not correspond to physical dependencies in the system, but where a validation depends at least in part upon another validation due in part to the structure or architecture of the network. In some embodiments, certain errors can be detected client side, such as errors relating to syntax, while other errors require at least calls to a server-side component to determine aspects such as existence and capacity.

Figure 3A:
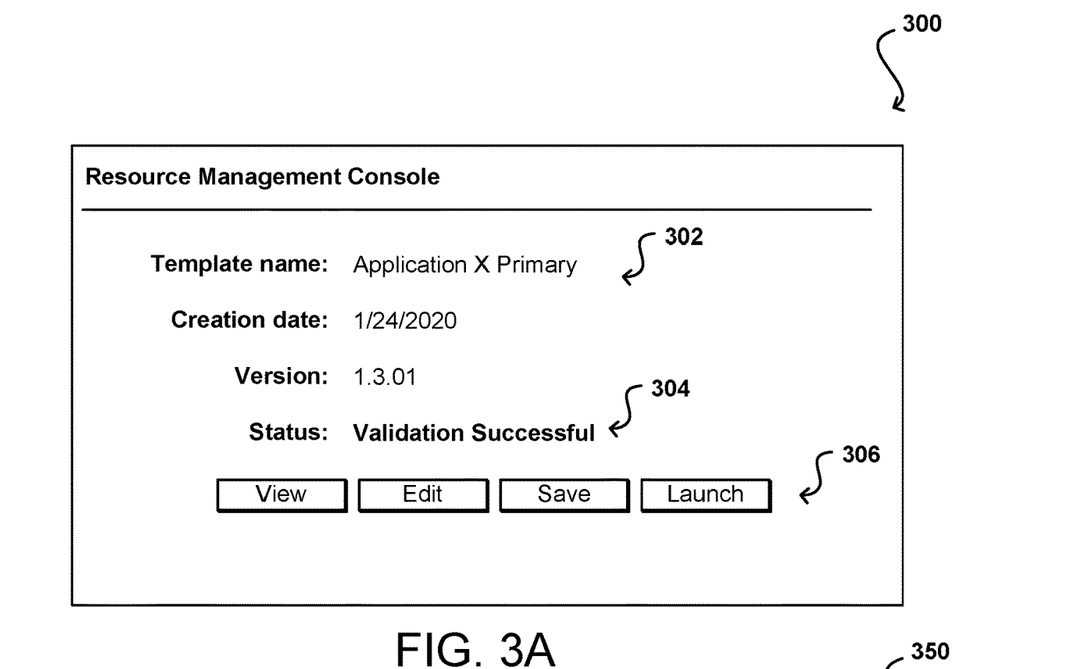
FIGS. 3A and 3B illustrate notifications that can be provided to a user in accordance with various embodiments.
Figure 3B:
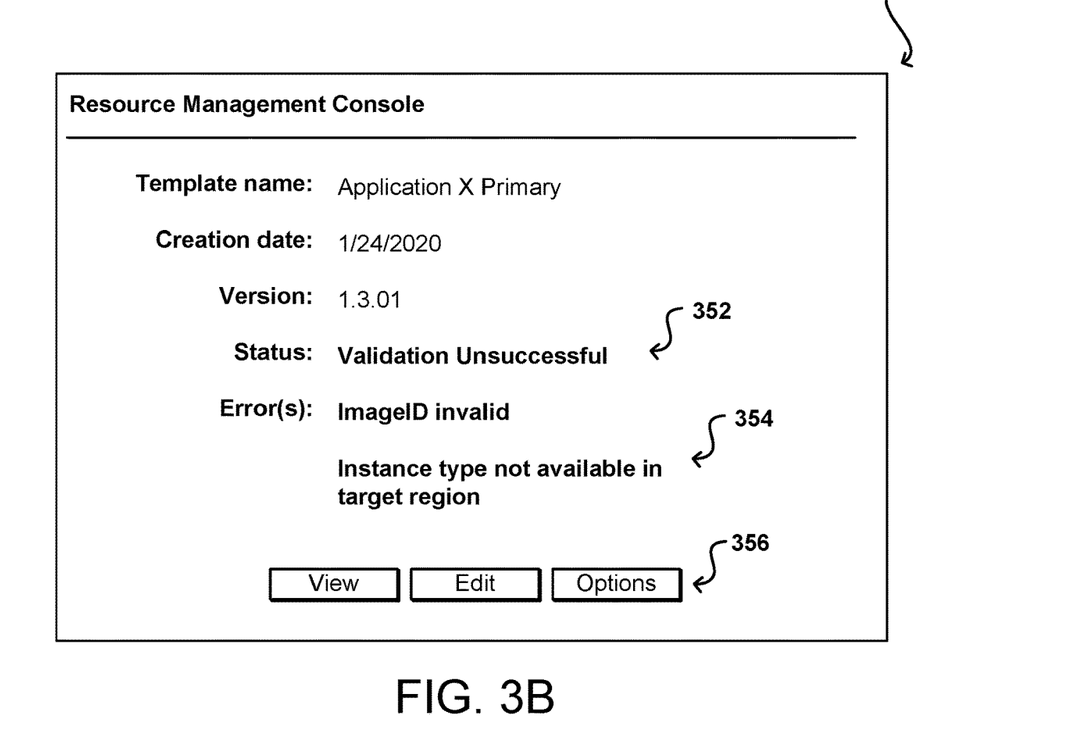

In at least one embodiment, multiple validations can be performed at various times. As mentioned a validation can be performed when a draft template has been created but before a customer uses that template to launch or provision an instance. The template can be analyzed and a result returned to the customer. If the template has been determined to be valid, an interface page 300 can be displayed as illustrated in FIG. 3A, where a validation success notification is provided 304 for a specified template name or identifier 302. The interface can provide various options 306 with the validation, such as options to view or edit the template, save the template for future use, or launch one or more instances using the template. If the template is not validated, an interface 350 can be displayed as illustrated in FIG. 3B, wherein a notification 352 of unsuccessful validation is provided, along with information 354 about errors that were detected during the validation process. Various options 356 can be provided to the user, such as to view or edit the template in light of the errors detected. In some embodiment a user can select options or recommendations for correcting the errors, which the user can then select or approve. In some embodiments a customer can specify that at least certain types of errors can be automatically corrected by the system, or that the system can make automated adjustments to a template as long as certain conditions are met, such as where cost does not increase or performance decrease, etc.

Figure 4:
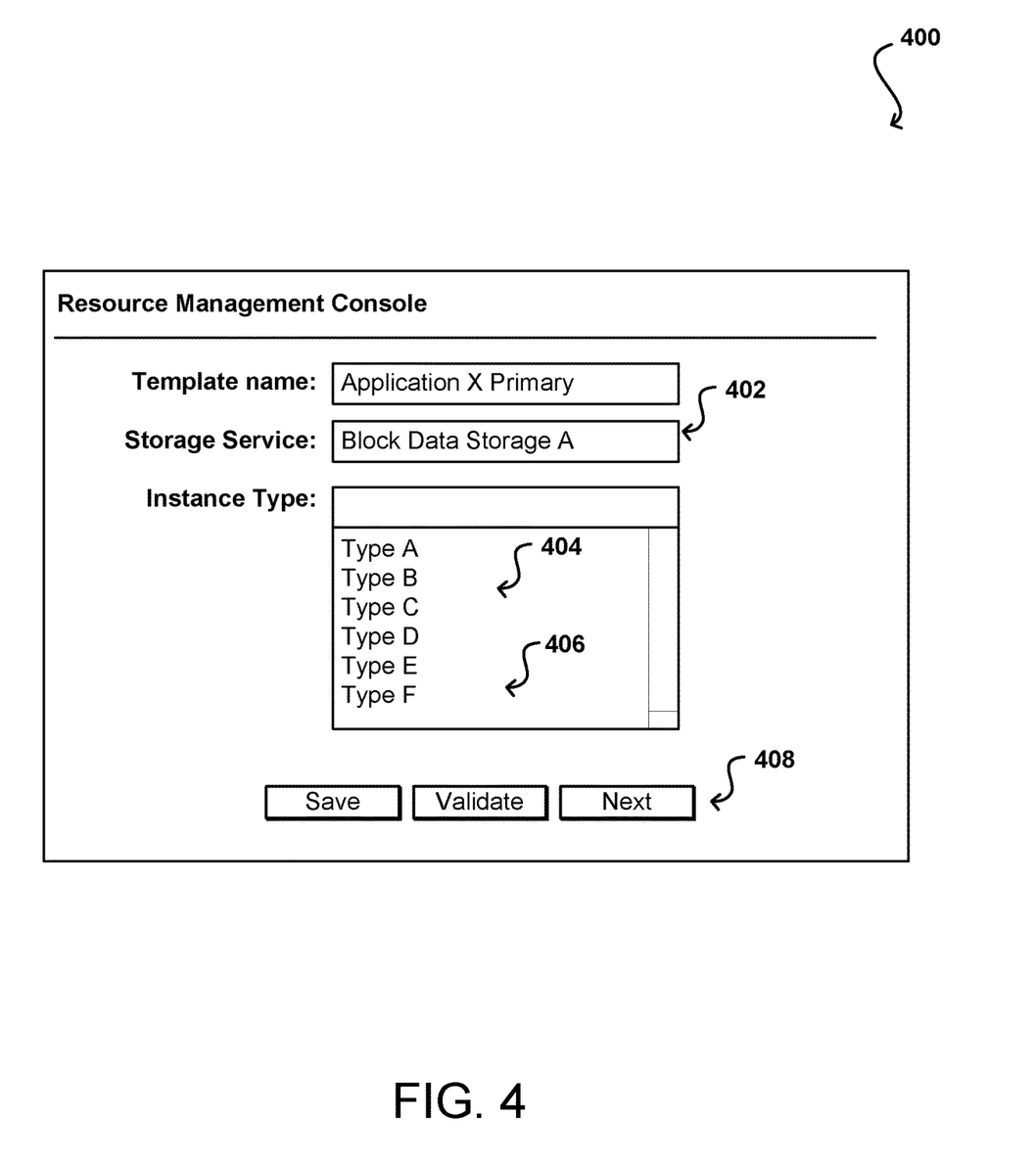
FIG. 4 illustrates an example template creation interface that can be utilized in accordance with various embodiments.

In at least some embodiments, certain validations can be performed during template creation. For example, FIG. 4 illustrates an example template creation interface 400 that can be generated in accordance with various embodiments. In this example, a user can specify values for the template, such as to specify a value for a Storage Service parameter 402. In this example, the syntax can be validated when a value is entered in a relevant field. Other static aspects of validation can be determined as well within the scope of various embodiments. Further, dependencies can be utilized to remove from considerations options for other fields that are invalid with the specified parameter value. For example, the storage service value specified is only compatible with three of six instance types. In this example, the user can choose from the three valid options 404 for that storage service value, but not from among the invalid options 406.

In this example the invalid options are still displayed but not selectable, in order for the user to be able to determine which options were removed from consideration due to prior selections, such that a user can make changes if one of the invalid instance types is preferred. In some embodiments recommendations can be given as well, such as where a certain instance type would provide higher performance or lower cost from among the valid options, or a currently selected option.

In at least some embodiments, other subsequent validations can be performed as well. For example, when the template is to be used to provision or launch an instance, another validation can be performed to ensure that the template is still valid for current conditions and existence. If the template is to be used to launch an instance for a new service, another validation may be performed to ensure that the template is valid for that service. Similar validations can occur for new environments or accounts, etc. In some embodiments periodic revalidations may also be performed to ensure validity, such as where the template is to be available for auto-scaling or other such functionality.

In some embodiments, a warning might be provided instead of an invalidity notification. This might be the case when a parameter might be valid at least some of the time, or under certain circumstances, or where there might be a downside to using a particular value. For example, a given region might support up to a maximum number of instances of a certain type, so a warning might be provided that only a certain number of instances of that type are available, and after that the template will not be valid to launch additional instances. In another instance, performance might drop off if more than a certain number of instances of a specific instance type are launched, so a warning might be provided to the user that the user might want to select a different instance type or region, etc. Various other warnings or recommendations can be provided as well within the scope of the various embodiments. In some embodiments, alternative values that would avoid those warnings can be provided.

In at least one embodiment, resource parameter templates can be used with resources such as those available from Amazon Web Services, Inc. (AWS), including EC2 instances. Launch templates can assist customers with creating a well-formed and usable launch template to be used by one or more services, such as RunInstances, EC2 Auto Scaling, and AWS Batch. Use of these templates, and their validation, reduces the time required to create usable launch templates by preventing customers from creating invalid launch templates, making errors visible and actionable. Customers can use launch templates to simplify the instance launch process by capturing all launch parameters into one resource, thereby reducing the number of steps required to create an instance, making the process easily reproducible, and enforcing instance configuration standards across their organization. A validation mechanism used during the launch template creation process can ensure usability of the template with the intended service, and can provide actionable corrective steps in case the validation fails so customers can easily fix their template. Customers can specify a service, or combination of services, for which they intend to use the launch template. A launch template creation workflow can check for existence of resources such as instance types, image ID, and subnets; perform cross parameter validation, for example if an ARM instance type is specified then it makes sure an ARM image is specified to go with it; and run security checks for resource level permissions to make sure the user is authorized to access the specified resources, for example, ensuring that the user has permissions to use the desired instance type. If any errors are identified when the customer proceeds to create the launch template, all errors along with corrective actions are displayed. Customers can have confidence of the validity of the launch template at the time of its creation as opposed knowing at a later time when they attempt to use it.

In at least one embodiment, a launch data validation API can be used to enable users to create a well formed and usable launch template to be used by one or more services. Information received through the API can prevent the creation of invalid launch templates, providing information about any errors along with actionable corrective steps, and reducing the time related to the current iterative process of trying different parameter values until a combination that works is determined. Such an API can be used when a new template is being created to perform tasks such as syntax validation, resource existence checks, cross parameter validations, and resource-level permission checks, and can provide for re-validation of these templates at a later time. Other services can use such an API to validate templates against those services as well. Parameters specified in a launch template can include parameters such as instance, network, security, storage, and advanced parameters used to launch instances.

In at least one embodiment, validation logic can be broken down into three different layers: parameter level validations, launch target validations, and resource-permission checks. Parameter level validations can include syntax validations (e.g., checking if the provided parameters are semantically correct), resource existence checks for the current user (e.g., ensuring that the provided resources—parameters with a resource ID—do in fact, exist), and cross-parameter validations (e.g., inter-parameter compatibility checks) for all provided launch parameters. Parameter-level validations act as a base layer validator that performs the basic and common validations on the launch template data, which can be necessary an instance-provisioning service with which a launch template is used. These validations can lead to parity and reusability across all services.

Launch target validations can entail the required individual parameter and cross-parameter validations for the supported instance provisioning use cases. These validations can be performed separately for all launch targets because different instance-provisioning services have different restrictions on launch parameters or launch parameter combinations, such that a launch template that works with one use case does not necessarily work with another use case. Resource-permission checks can be responsible for checking if a user has authorization to use the specified resources in the launch template. This layer can check the user's identity management policies against each of the provided resources and determine whether or not access is granted to those resources.

In one embodiment, a customer-facing validation API can accept various launch data to be validated, as may include a launch template identifier, launch template name, version, and launch targets. A launch target can correspond to an instance-provisioning service for which customers intend to use the specified launch template. Customers can give a list of launch targets and this API can be used to validate compatibility of the launch template being created with each of the provided launch targets. If no launch targets are specified, parameter level validation can be performed, which can include syntax, cross-parameter, and resource existence check. An example failure notification for an invalid Image ID might return an error code, along with an error message such as "ami-12345678 does not exist, please use another image id." Another example error message corresponds to "The parameter 'InstanceProfile.Arn' may not be used in combination with 'InstanceProfile.Name'."

Figure 5:
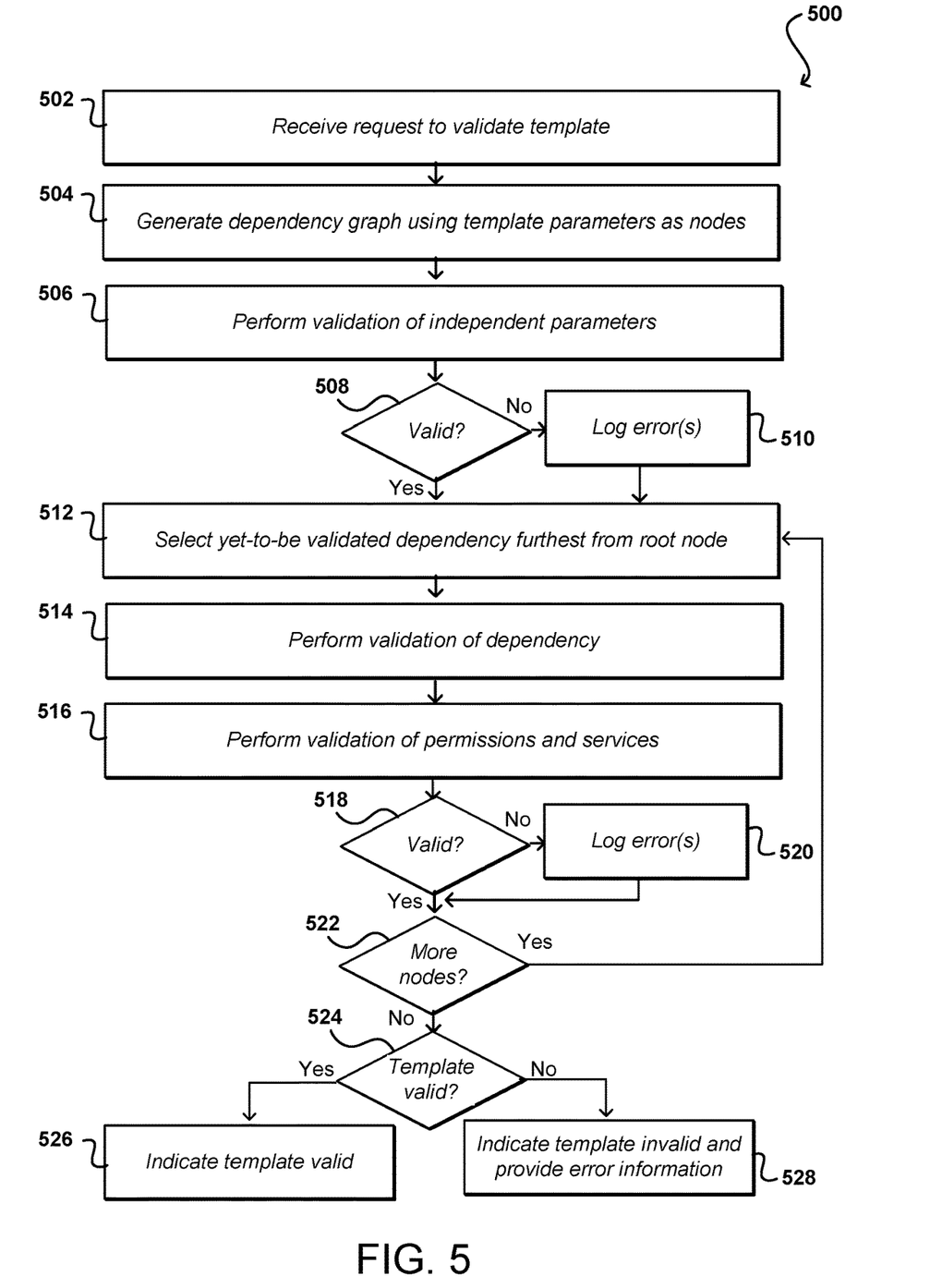
FIG. 5 illustrates an example process for validating a template that can be utilized in accordance with various embodiments.

FIG. 5 illustrates an example process 500 for validating a launch template that can be utilized in accordance with various embodiments. It should be understood that there can be additional, fewer, or alternative steps performed in similar or alternative orders, or in parallel, within the scope of the various embodiments unless otherwise specifically stated. In this example, a request is received 502 to validate a template, such as a launch template or a resource parameter template. The request can be received through a console or an API, among other such options. Information for the template can be analyzed to generate 504 a dependency graph, where template parameters are represented by nodes connected by dependencies. A first validation can be performed 506 wherein individual parameters are independently validated, such as to check for proper syntax. A determination can be made 508 as to whether each of these parameters is independently valid, and if not then any error data can be logged 510 or otherwise cached, and the process can continue to attempt to process as much of the template as possible.

After independent validation is performed, dependent validations can be performed starting at leaf or edge nodes of the dependency graph. In this example, a yet-to-be validated dependency furthest from a root node 512, or closest to a leaf node, can be selected 512 and a validation of that dependency performed. A determination can be made 514 as to whether the dependency is valid. Other validations can be performed 516 as well as discussed elsewhere herein, such as to validate relevant permissions or requirements that may be specific to certain services that may be utilized by an instance if launched according to the template. If it is determined 518 that one or more of these validations fails then data for any determined errors can be logged 520 or cached, and the process can continue. A determination can be made 522 as to whether there are more nodes or parameters with dependencies to be validated. If so, the process can continue. If not, a result of the template validation can be returned to the user. If it is determined 524 that the template is valid, then information can be provided to indicate 526 that the template is valid and can be used to launch one or more instances. If the template is not valid, then information can be provided to indicate 528 that the template is invalid and information for any determined errors can be provided, whereby the user can make appropriate adjustments to the template and attempt another validation. Even after a template is validated, it may be re-validated at future points in time to ensure that the template remains valid for its intended use.

Figure 6:
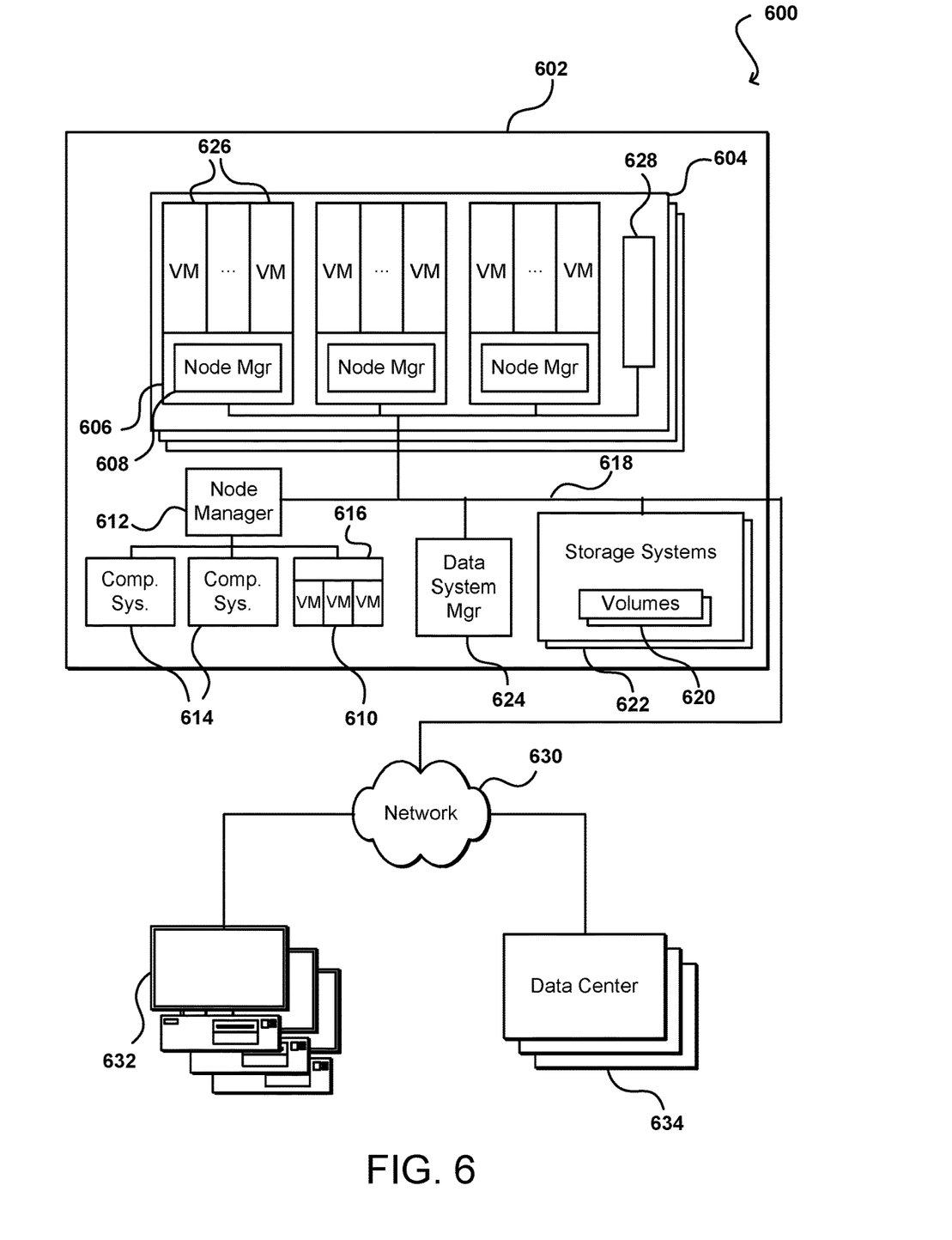
FIG. 6 illustrates components of an example data center that can be utilized in accordance with various embodiments.

FIG. 6 illustrates an example network configuration 600 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 602 includes a number of racks 604, each rack including a number of host computing devices 606, as well as an optional rack support computing system 628 in this example embodiment. The host computing systems 606 on the illustrated rack 604 each host one or more virtual machines 626 in this example, as well as a distinct node manager module 612 associated with the virtual machines on that host computing system to manage those virtual machines. One or more other host computing systems 616 may also each host one or more virtual machines 610 in this example. Each virtual machine 610 may act as an independent resource node for executing one or more program copies or performing another such action or process for user data requests, I/O operations, etc. In addition, this example data center 602 further includes additional host computing systems 614 that do not include distinct virtual machines, but may nonetheless each act as a resource node for one or more tasks being executed for a user. In this example, a node manager module 612 executing on a computing system (not shown) distinct from the host computing systems 614 and 616 is associated with those host computing systems to manage the resource nodes provided by those host computing systems, such as in a manner similar to the node manager modules 608 for the host computing systems 606. The rack support computing system 628 may provide various utility services for other computing systems local to its rack 604 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 602 also includes a computing system 624 that executes a data storage system manager module for the block-based data storage service to assist in managing the availability of non-local block-based data storage to programs executing on resource nodes provided by the host computing systems located within the data center (or optionally on computing systems located in one or more other data centers 634, or other remote computing systems 632 external to the data center). In particular, in this example the data center 602 includes a pool of multiple block-based data storage systems 622, which each have local block-based storage for use in storing one or more volume copies 620. Access to the volume copies 620 is provided over the internal network(s) 618 to programs executing on various resource nodes 610 and 614. As discussed in greater detail elsewhere, a block-based data storage system manager module 624 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 622 may coordinate with the node manager modules 612, 608 to manage use of volumes by programs executing on associated resource nodes, while in other embodiments the node manager modules may not be used to manage such volume use. In addition, in other embodiments, one or more system manager modules 624 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 622 (e.g., in a peer-to-peer manner, without any separate centralized system manager module on a computing system 624).

In this example, the various host computing systems, server block data storage systems, and computing systems are interconnected via one or more internal networks 618 of the data center, which may include various networking devices (e.g., routers, switches, gateways, etc.) that are not shown. In addition, the internal networks 618 are connected to an external network 630 (e.g., the Internet or another public data network) in this example, and the data center 602 may further include one or more optional devices (not shown) at the interconnect between the data center and an external network (e.g., network proxies, load balancers, network address translation devices, etc.). In this example, the data center 602 is connected via the external network 630 to one or more other data centers 634 that each may include some or all of the computing systems and storage systems illustrated with respect to data center 602, as well as other remote computing systems 632 external to the data center. The other computing systems 632 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 6 has been simplified for the purposes of explanation, and that the number and organization of host computing systems, server block data storage systems and other devices may be much larger than what is depicted in FIG. 6. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 6 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 6, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Figure 7:
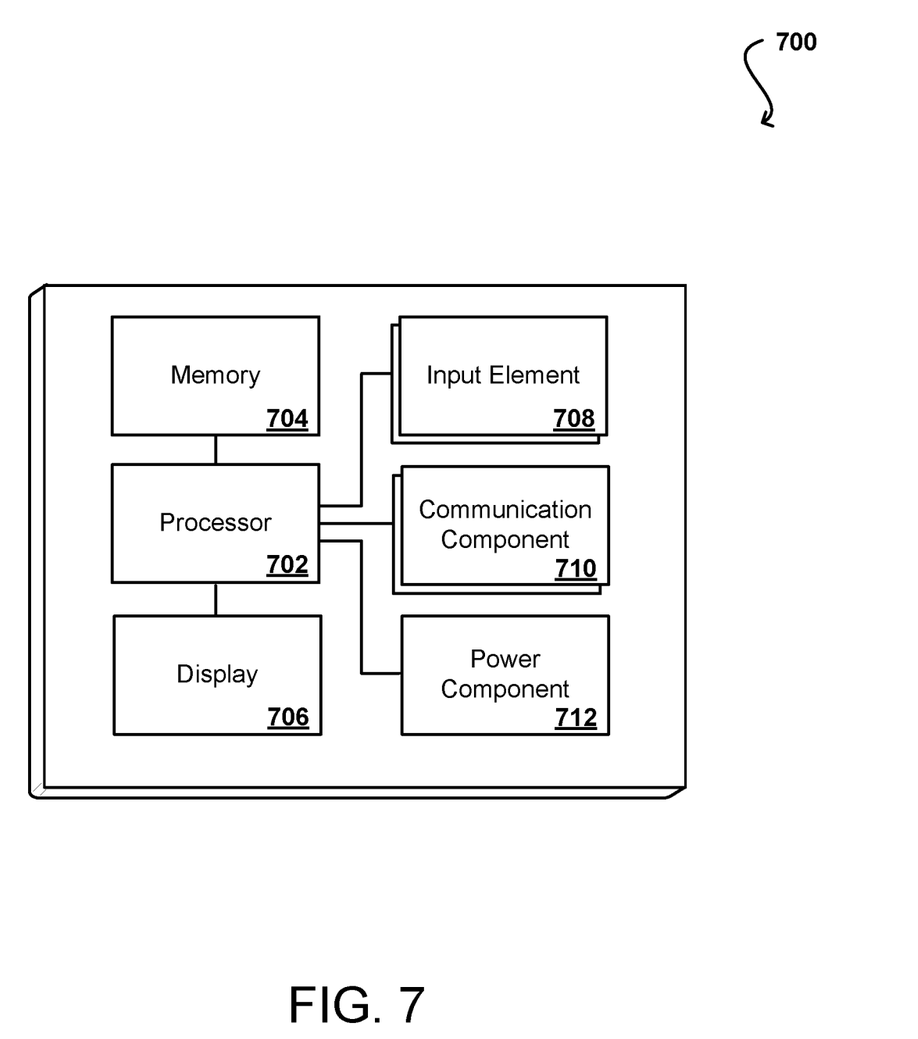
FIG. 7 illustrates components of an example computing device that can be used to perform aspects of the various embodiments.

FIG. 7 illustrates a logical arrangement of a set of general components of an example computing device 700. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 708 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface or communication elements or components 710 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 712, such as power cords, power ports, batteries, wirelessly powered or rechargeable receivers, and the like.

Example environments discussed herein for implementing aspects in accordance with various embodiments are primarily Web-based, as relate to Web services and cloud computing environments, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a request to validate a launch template including a plurality of parameters to be used to launch a resource in a cloud computing environment;
generating, from the launch template, a dependency graph including the plurality of parameters as nodes connected by cross-parameter dependencies;
performing independent validation for the plurality of parameters;
performing, subsequent to the independent validation, dependent validation of the cross-parameter dependencies;
logging error information if an error is encountered during the independent validation or the dependent validation;
providing, in response to the request, indication as to whether the launch template is valid, an indication of invalidity being accompanied with the error information;
receiving an updated launch template accounting for the error information; and
causing validation to be performed for the updated launch template, after accounting for the error information.

2. The computer-implemented method of claim 1, further comprising:
performing the dependent validation of the cross-parameter dependencies starting with one or more leaf nodes of the dependency graph.

3. The computer-implemented method of claim 1, wherein the independent validation includes at least one of a validation of syntax, capacity, permission, or existence corresponding to a specified resource parameter.

4. The computer-implemented method of claim 1, wherein the request is received through a template management console or an application programming interface (API).

5. The computer-implemented method of claim 1, wherein the resource is one of a storage volume, a compute instance, and a network interface to be launched in a resource provider environment.

6. A computer-implemented method, comprising:
- performing independent validation of parameters of a resource launch template;
- performing dependent validation of cross-parameter dependencies of the resource launch template;
- providing indication as to whether the resource launch template is valid, wherein the indication includes information for one or more errors if the resource launch template is determined to be invalid;
- receiving an updated launch template accounting for the one or more errors; and
- causing validation to be performed for the updated launch template.

7. The computer-implemented method of claim 6, further comprising:
- generating a dependency graph from the resource launch template, the dependency graph including nodes, corresponding to the parameters, connected by the cross-parameter dependencies.

8. The computer-implemented method of claim 7, further comprising:
- performing the dependent validation starting at leaf nodes of the dependency graph; and
- continuing to attempt to perform the dependent validation if one or more parameters or cross-parameter dependencies are determined to be invalid.

9. The computer-implemented method of claim 6, further comprising:
- performing additional validation of at least one permission or service associated with the resource launch template.

10. The computer-implemented method of claim 6, further comprising:
- logging error information for the one or more errors during at least one of the independent validation or the dependent validation.

11. The computer-implemented method of claim 6, further comprising:
- providing, with the information for one or more errors, one or more recommendations for correcting the one or more errors.

12. The computer-implemented method of claim 11, further comprising:
- performing a revalidation of the resource launch template after the correcting of the one or more errors.

13. The computer-implemented method of claim 6, further comprising:
- receiving a request to launch a resource instance using the resource launch template; and
- performing a revalidation of the resource launch template.

14. The computer-implemented method of claim 6, wherein the independent validation of parameters includes validating at least one of syntax, capacity, permission, or existence.

15. The computer-implemented method of claim 6, wherein the dependent validation of cross-parameter dependencies includes determining whether values of two or more of the parameters are valid together for a resource instance to be launched using the resource launch template.

16. A system, comprising:
- at least one processor; and
- memory including instructions that, upon being executed by the at least one processor, cause the system to:
  - perform independent validation of parameters of a resource launch template;
  - perform dependent validation of cross-parameter dependencies of the resource launch template;
  - provide indication as to whether the resource launch template is valid, wherein the indication includes information for one or more errors if the resource launch template is determined to be invalid;
  - receive an updated launch template accounting for the one or more errors; and
  - cause validation to be performed for the updated launch template.

17. The system of claim 16, wherein the instructions when executed further cause the system to:
- generate a dependency graph from the resource launch template, the dependency graph including nodes, corresponding to the parameters, connected by the cross-parameter dependencies.

18. The system of claim 17, wherein the instructions when executed further cause the system to:
- perform the dependent validation starting at leaf nodes of the dependency graph.

19. The system of claim 17, wherein the instructions when executed further cause the system to:
- log error information for the one or more errors during at least one of the independent validation or the dependent validation.

20. The system of claim 19, wherein the instructions when executed further cause the system to:
- provide, with the information for one or more errors, one or more recommendations for correcting the one or more errors.

* * * * *